United States Patent

Kobayashi

[11] 4,416,519
[45] Nov. 22, 1983

[54] OBJECTIVE FOR VIDEO DISKS

[75] Inventor: Yuko Kobayashi, Hachiouji, Japan

[73] Assignee: Olympus Optical Co., Ltd., Tokyo, Japan

[21] Appl. No.: 294,826

[22] Filed: Aug. 21, 1981

[30] Foreign Application Priority Data

Sep. 2, 1980 [JP] Japan ............... 55-120645[U]

[51] Int. Cl.³ .................. G02B 9/14; G02B 21/02
[52] U.S. Cl. .................... 350/475; 350/414
[58] Field of Search ................ 350/475, 414

[56] References Cited

U.S. PATENT DOCUMENTS

| | | |
|---|---|---|
| 4,139,266 | 2/1979 | Koizumi . |
| 4,257,679 | 3/1981 | Okawa .................. 350/414 |
| 4,258,981 | 3/1981 | Goto .................... 350/414 X |
| 4,270,843 | 6/1981 | Goto .................... 350/414 X |

FOREIGN PATENT DOCUMENTS

| | | |
|---|---|---|
| 2703823 | 8/1977 | Fed. Rep. of Germany ...... 350/475 |
| 52-31754 | 3/1977 | Japan . |
| 52-71253 | 6/1977 | Japan . |
| 52-97750 | 8/1977 | Japan . |
| 54-67445 | 5/1979 | Japan . |

*Primary Examiner*—John K. Corbin
*Assistant Examiner*—Scott J. Sugarman
*Attorney, Agent, or Firm*—Cushman, Darby & Cushman

[57] ABSTRACT

An objective for video disks comprising a first, second and third lenses in which the first lens is a positive lens, the second lens is a negative lens and the third lens is a positive meniscus lens having a concave surface on the video disk side. This objective is small, light in the weight and has a large N.A.

7 Claims, 10 Drawing Figures

OBJECTIVE FOR VIDEO DISKS

BACKGROUND OF THE INVENTION (a) Field of the Invention

The present invention relates to an objective for video disks comprising three lens elements, which is small and light in the weight and has a large N.A.

(b) Description of the Prior Art

In general, objectives for video disks for performing automatic collimation are desired to be small and light in the weight since they are used in movable portions. Further, in order to make a beam spot small, it is favourable to have a large N.A. Particularly, in case a semiconductor laser as a light source, due to the long wavelength of light beam from the light source, a small beam spot will not be obtained if N.A. is not large.

A known conventional objectives for video disks comprising three lens elements, there are such lenses as disclosed in Japanese Patent Laid-Open Nos. 71253/77, 97750/77 and 67445/79. These objectives have N.A. 0.5, 0.4 and 0.4 respectively and, therefore, they cannot be said yet as having enough large N.A. As a conventional objective for video disks having large N.A., there is such lens as disclosed in Japanese Patent Laid-Open No. 31754/77. However, as this objective comprises five lens elements, it is heavy and high in the manufacturing cost.

SUMMARY OF THE INVENTION

A primaryr object of the present invention is to provide an objective for video disks comprising three lens elements which is small, light in the weight and has large N.A. so as to be used also in semi-conductor laser.

The objective for video disks according to the present invention comprises a first lens which is a biconvex or planoconvex lens, a second lens which is a negative meniscus lens having the convex surface on the video disk side or a planoconcave or biconcave lens and third lens which is a positive meniscus lens having the concave surface on the video disk side. Besides, the objective for video disks according to the present invention satisfies the following conditions:

(1) $1.5 < f_{12}/f_3 < 3.0$
(2) $0.7f < D < 1.9f$ wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system.

The upper and lower limits of the above-mentioned conditions have meanings as explained below.

Among the above-mentioned conditions, the condition (1) is established for the purpose of correcting spherical aberration including very severe correction requirements as the objective for video disks and also N.A. having very large sine condition favourably.

If, in the condition (1), $f_{12}/f_3$ becomes larger than the upper limit, sine condition becomes so large that performance required as an objective for video disks is not satisfied. If $f_{12}/f_3$ becomes smaller than the lower limit, sine condition will be overcorrected and correction of spherical aberration will be difficult.

The condition (2) is established for purpose of making the objective for video disks small and light in the weight as required and elongating the working distance and further correcting aberrations favourably.

If, in the condition (2), D becomes larger than the upper limit, the compactness and lightness which are desirable as the objective for video disks will deteriorate and the working distance will shorten. If D becomes smaller than the lower limit, astigmatism (especially, astigmatic difference) becomes too large to correct and also the productivity of lens will deteriorate very much.

DETAILED DESCRIPTION OF THE PREFERRED EMBODIMENTS

Figure 1:
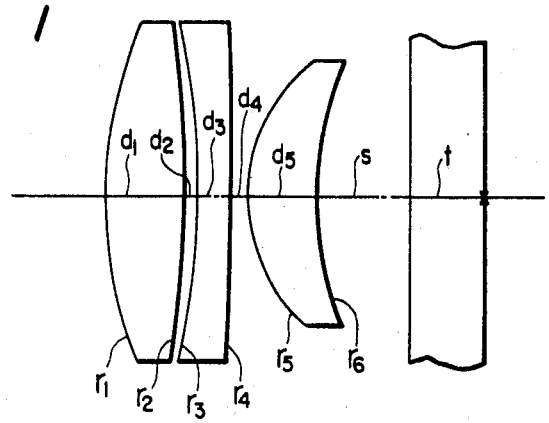
FIG. 1 shows a sectional view of Embodiments 1 and 2 of the present invention.
Figure 2:
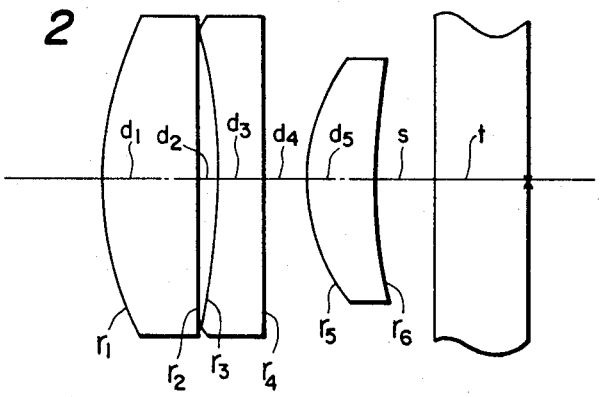
FIG. 2 shows a sectional view of Embodiment 4 of the present invention.
Figure 3:
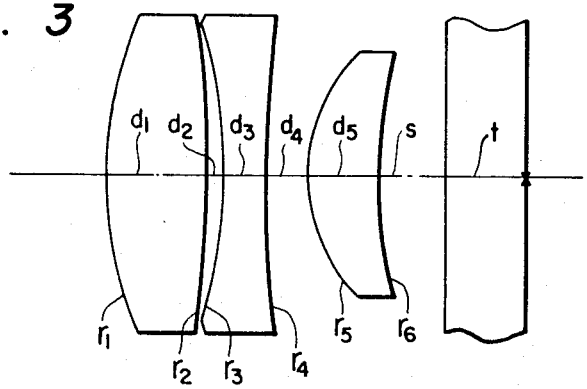
FIG. 3 shows a sectional view of Embodiments 3, 5, 6 and 7 of the present invention.
Figure 4:
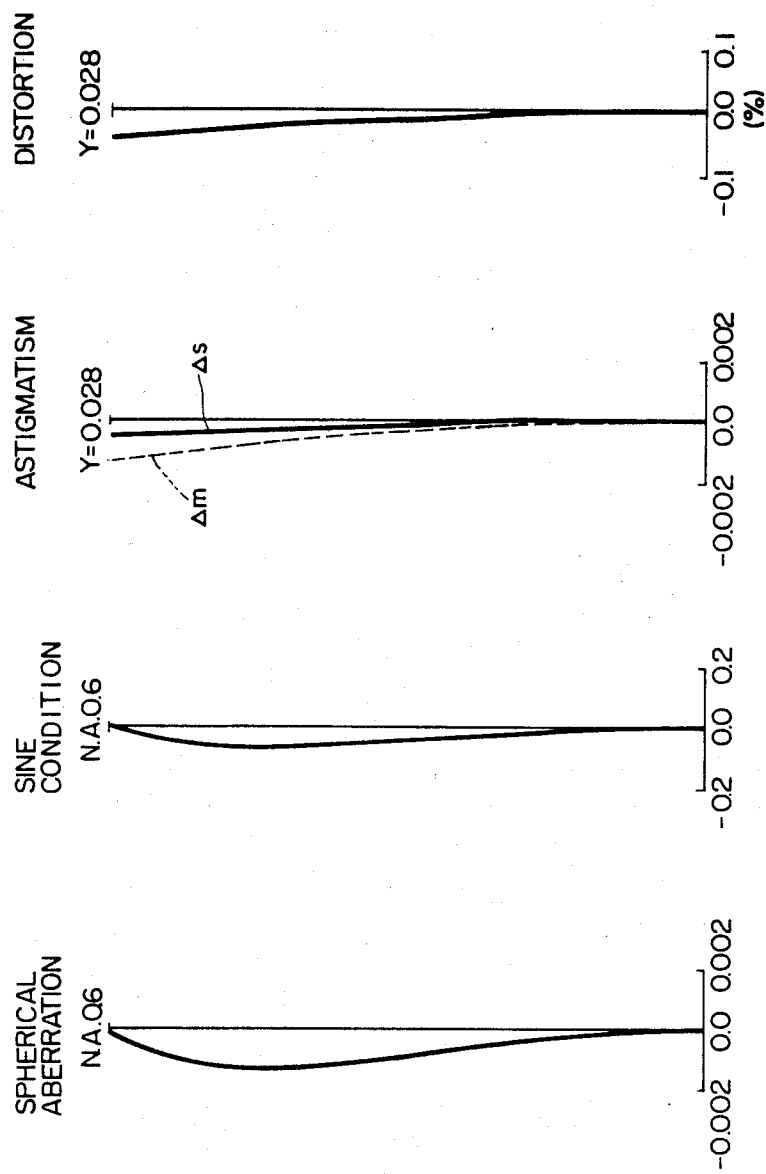
FIGS. 4 through 10 show graphs illustrating aberration curves of the respective Embodiments.
Figure 5:
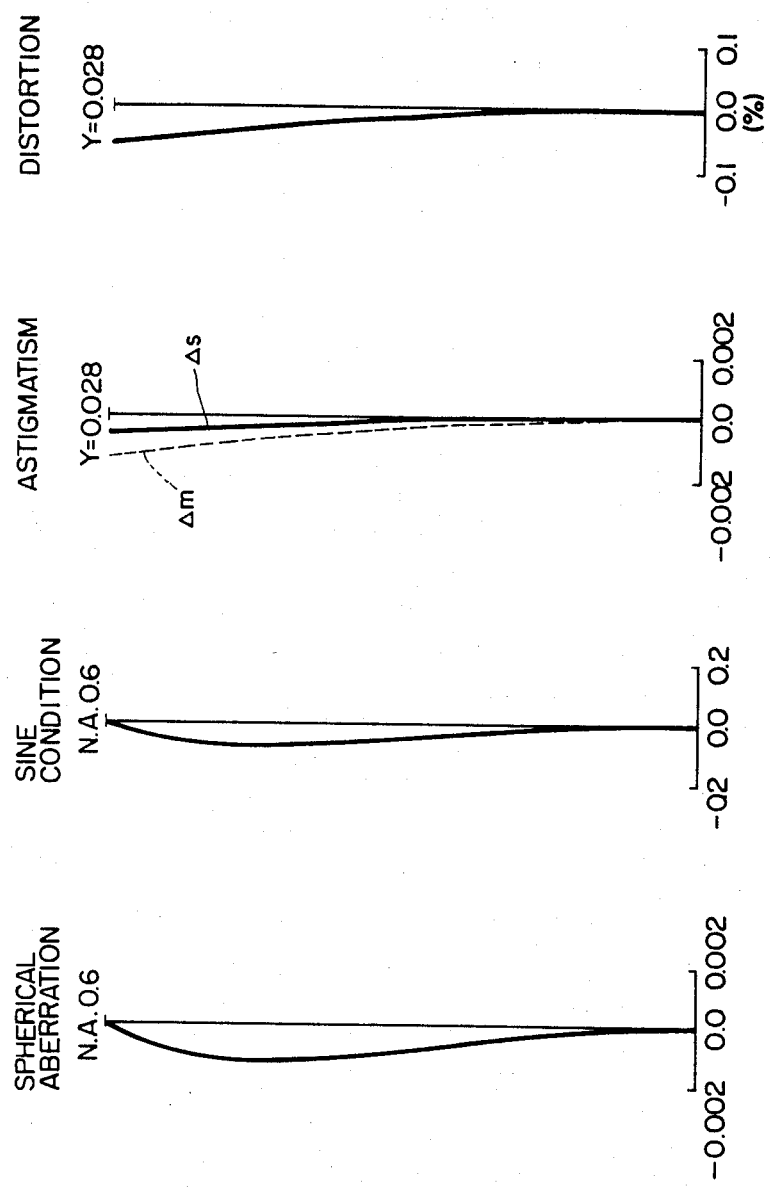
Figure 6:
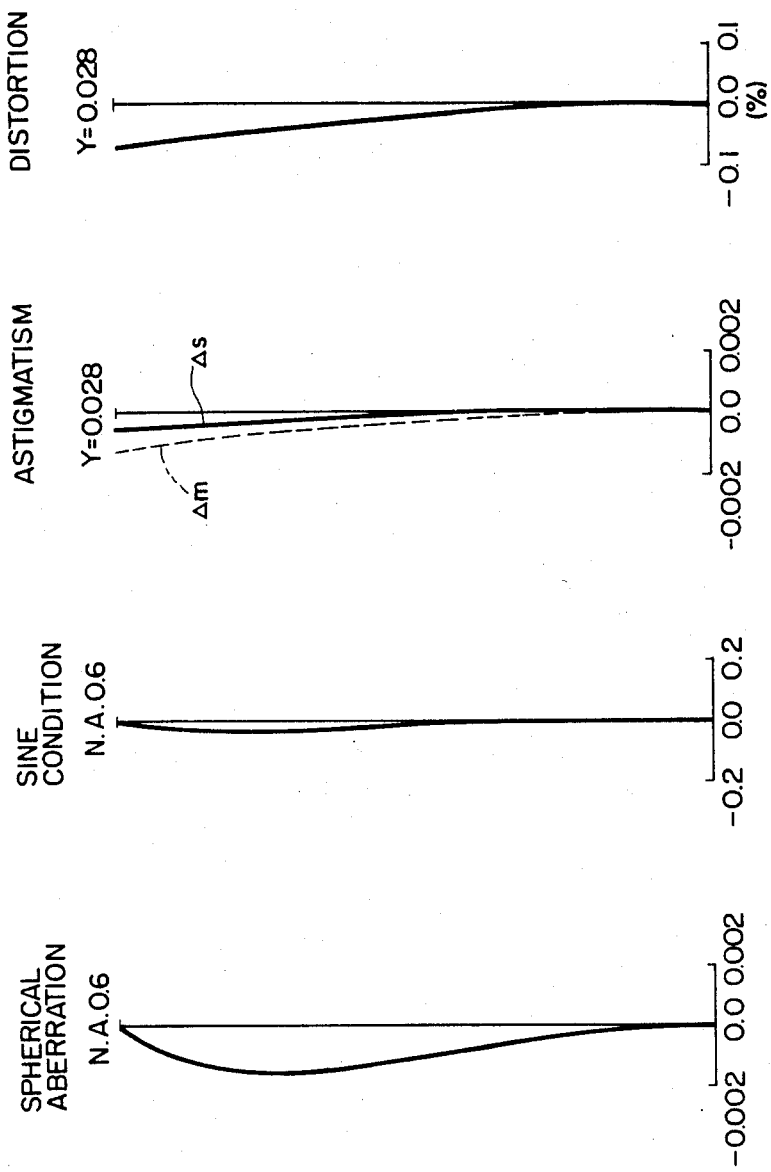
Figure 7:
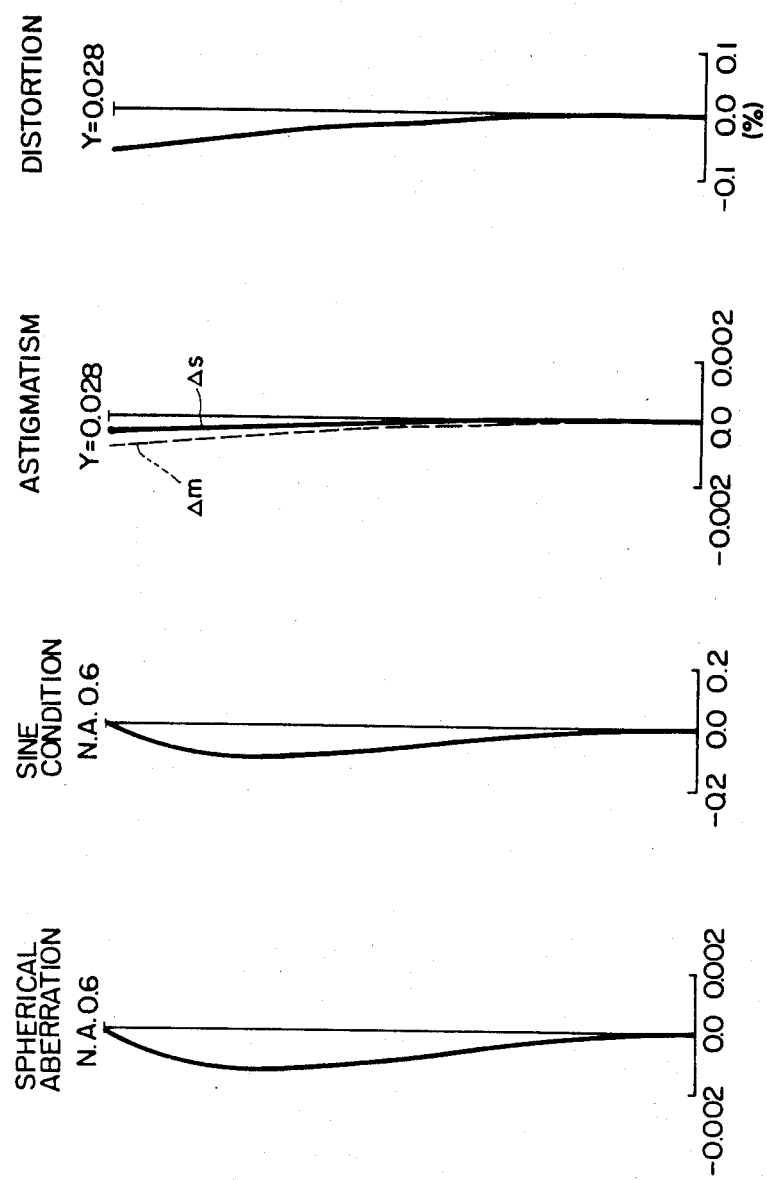
Figure 8:
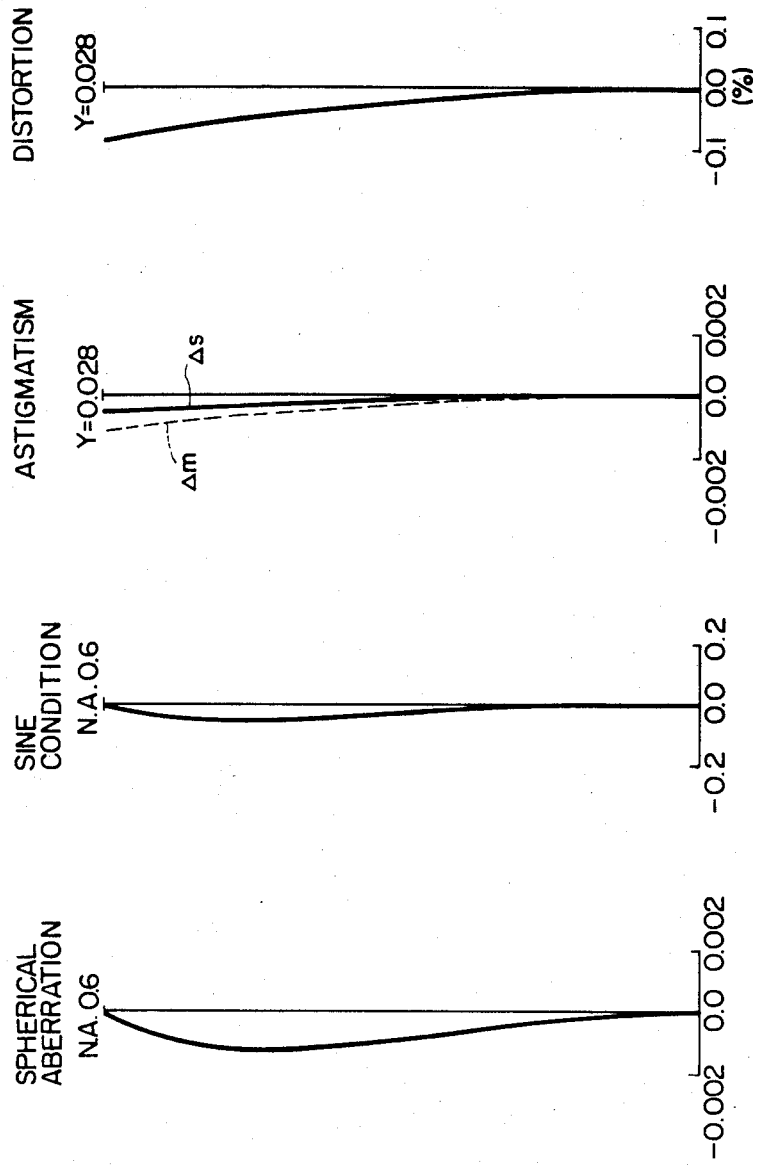
Figure 9:
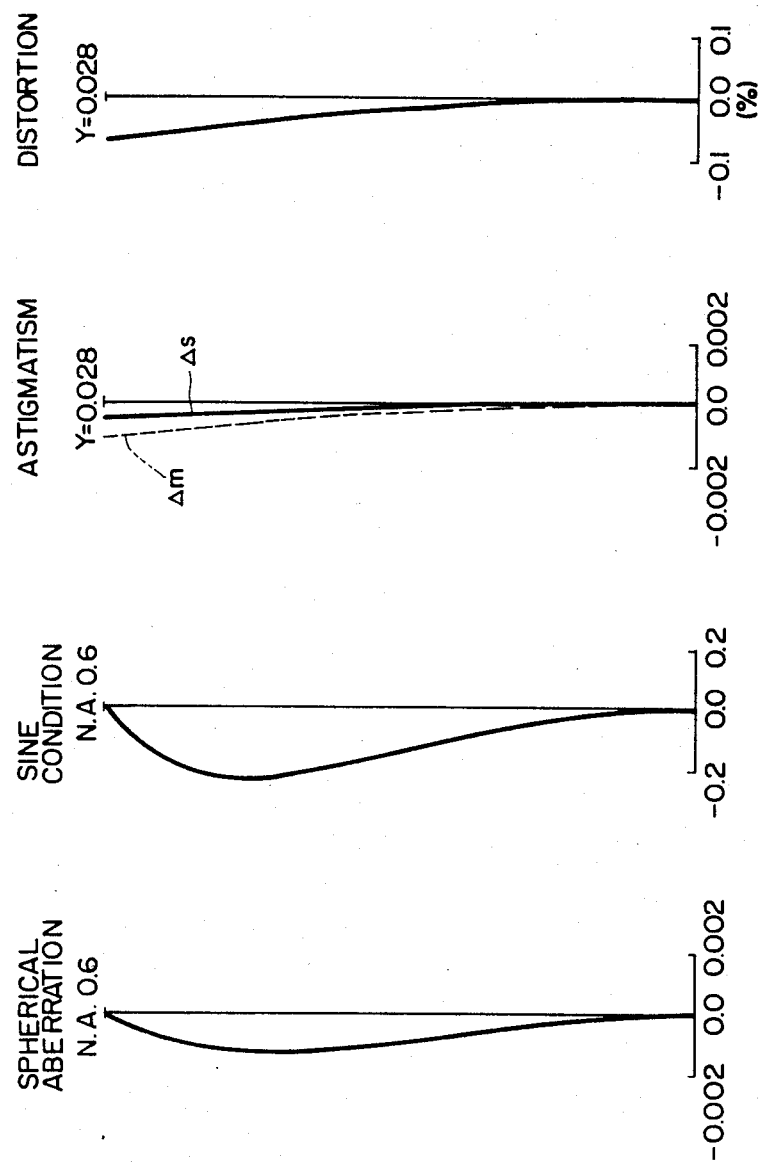
Figure 10:
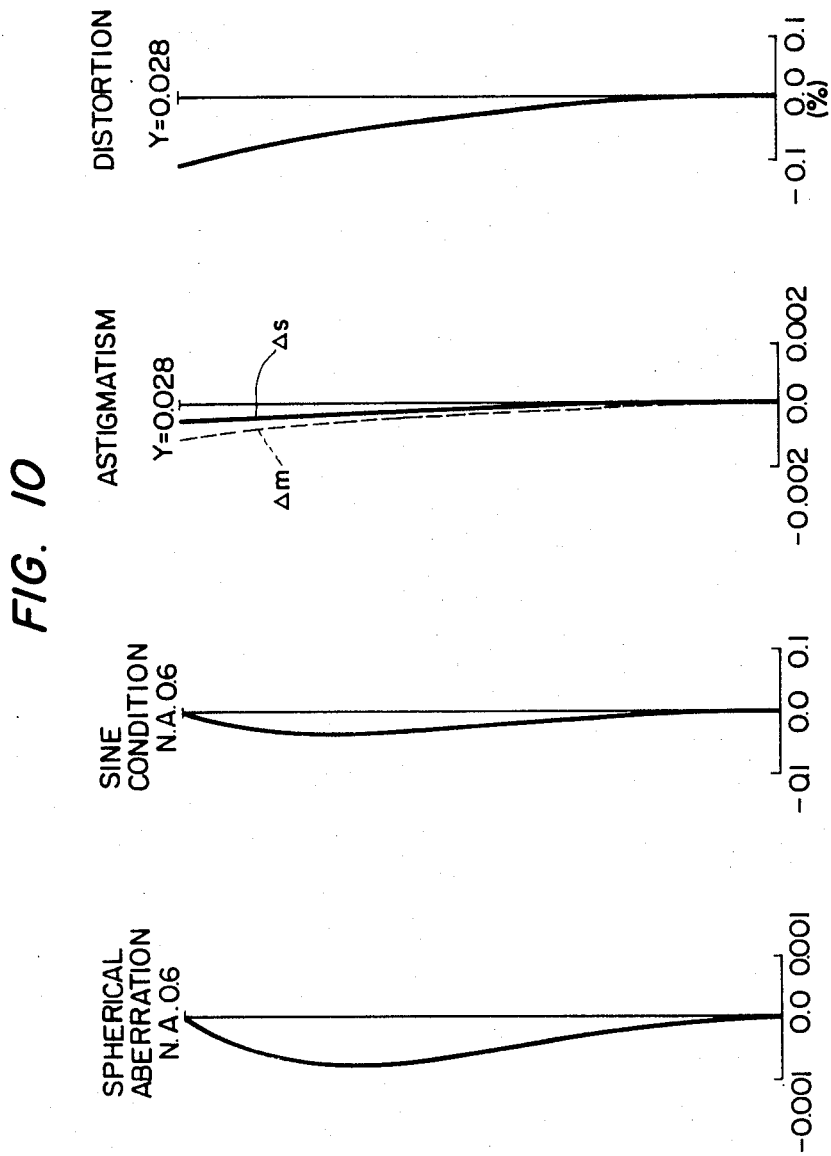

Preferred embodiments of the objective for video disks according to the present invention explained in the above are as shown below.

Embodiment 1

$r_1 = 1.5700$
$r_2 = -4.5434$
$r_3 = -2.8939$
$r_4 = -28.7100$
$r_5 = 0.6472$
$r_6 = 1.2643$ $d_1 = 0.3355 \quad n_1 = 1.69981 \quad \nu_1 = 29.51$
$d_2 = 0.0530$
$d_3 = 0.1395 \quad n_2 = 1.74132 \quad \nu_2 = 26.52$
$d_4 = 0.0698$
$d_5 = 0.3070 \quad n_3 = 1.76300 \quad \nu_3 = 25.68$ $f = 1$
$t = 0.3349$
$f_{12} = 2.614, \quad f_3 = 1.430, \quad f_{12}/f_3 = 1.83$
$D(= d_1 + d_2 + d_3 + d_4 + d_5) = 0.905$
$s = 0.48$ Embodiment 2

$r_1 = 1.5769$
$r_2 = -4.5846$
$r_3 = -2.8770$
$r_4 = -33.3617$
$r_5 = 0.6308$
$r_6 = 1.2879$ $d_1 = 0.3353 \quad n_1 = 1.69981 \quad \nu_1 = 29.51$
$d_2 = 0.0530$
$d_3 = 0.1395 \quad n_2 = 1.74132 \quad \nu_2 = 26.52$
$d_4 = 0.1675$
$d_5 = 0.307 \quad n_3 = 1.763 \quad \nu_3 = 25.68$ $f = 1$
$t = 0.3349$
$f_{12} = 2.668, \quad f_3 = 1.348, \quad f_{12}/f_3 = 1.98$
$D = 1.002$
$s = 0.44$

Embodiment 3

$r_1 = 1.3601$
$r_2 = -4.5817$
$r_3 = -2.8417$
$r_4 = 43.4851$
$r_5 = 0.6087$
$r_6 = 1.2493$ $d_1 = 0.4177$  $n_1 = 1.6728$  $\nu_1 = 31.08$
$d_2 = 0.053$
$d_3 = 0.1954$  $n_2 = 1.74132$  $\nu_2 = 26.52$
$d_4 = 0.1675$
$d_5 = 0.307$  $n_3 = 1.763$  $\nu_3 = 25.68$ $f = 1$
$t = 0.3349$ $\left.\begin{array}{l}f_{12} = 2.566\\f_3 = 1.288\end{array}\right\}\; \dfrac{f_{12}}{f_3} = 1.99$ $D = 1.14$
$s = 0.39$

Embodiment 4

$r_1 = 1.4005$
$r_2 = \infty$
$r_3 = -2.6447$
$r_4 = \infty$
$r_5 = 0.7064$
$r_6 = 2.5599$ $d_1 = 0.4186$  $n_1 = 1.763$  $\nu_1 = 25.68$
$d_2 = 0.0698$
$d_3 = 0.1954$  $n_2 = 1.52331$  $\nu_2 = 48.90$
$d_4 = 0.1786$
$d_5 = 0.307$  $n_3 = 1.763$  $\nu_3 = 25.68$ $f = 1$
$t = 0.4186$ $\left.\begin{array}{l}f_{12} = 2.631\\f_3 = 1.193\end{array}\right\}\; \dfrac{f_{12}}{f_3} = 2.21$ $D = 1.169$
$s = 0.43$

Embodiment 5

$r_1 = 1.4177$
$r_2 = -6.3926$
$r_3 = -2.9891$
$r_4 = 7.7025$
$r_5 = 0.6097$
$r_6 = 1.5251$ $d_1 = 0.4996$  $n_1 = 1.763$  $\nu_1 = 25.68$
$d_2 = 0.0636$
$d_3 = 0.2344$  $n_2 = 1.74132$  $\nu_2 = 26.52$
$d_4 = 0.2009$
$d_5 = 0.3684$  $n_3 = 1.763$  $\nu_3 = 25.68$ $f = 1$
$t = 0.3349$ $\left.\begin{array}{l}f_{12} = 2.723\\f_3 = 1.134\end{array}\right\}\; \dfrac{f_{12}}{f_3} = 2.4$ $D = 1.37$
$s = 0.39$

Embodiment 6

$r_1 = 1.6389$
$r_2 = -4.6948$
$r_3 = -2.1398$
$r_4 = 6.7465$
$r_5 = 0.6569$
$r_6 = 2.0347$ $d_1 = 0.4189$  $n_1 = 1.763$  $\nu_1 = 25.68$
$d_2 = 0.0698$
$d_3 = 0.1954$  $n_2 = 1.52331$  $\nu_2 = 48.90$
$d_4 = 0.1675$
$d_5 = 0.307$  $n_3 = 1.763$  $\nu_3 = 25.68$ $f = 1$
$t = 0.3349$ $\left.\begin{array}{l}f_{12} = 2.93\\f_3 = 1.16\end{array}\right\}\; \dfrac{f_{12}}{f_3} = 2.53$ $D = 1.16$
$s = 0.42$

Embodiment 7

$r_1 = 1.5597$
$r_2 = -9.8509$
$r_3 = -3.0851$
$r_4 = 35.5353$
$r_5 = 0.6066$
$r_6 = 1.6564$ $d_1 = 0.5994$  $n_1 = 1.763$  $\nu_1 = 25.68$
$d_2 = 0.0763$
$d_3 = 0.2813$  $n_2 = 1.74132$  $\nu_2 = 26.52$
$d_4 = 0.2411$
$d_5 = 0.4421$  $n_3 = 1.763$  $\nu_3 = 25.68$ $f = 1$
$t = 0.3349$ $\left.\begin{array}{l}f_{12} = 2.871\\f_3 = 1.061\end{array}\right\}\; \dfrac{f_{12}}{f_3} = 2.71$ $D = 1.64$
$s = 0.24$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

I claim:

1. An objective for video disks consisting of a first, second and third lenses, said first lens being a positive lens, said second lens being a negative lens, said third lens being a positive meniscus lens having a concave surface on the video disk side, said objective for video disks satisfying the following conditions:

(1) $1.5 < f_{12}/f_3 < 3.0$
(2) $0.7f < D < 1.65f$ wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and
   in which said objective for video disks has the following numerical data:

$r_1 = 1.5700$
   $d_1 = 0.3355$  $n_1 = 1.69981$  $\nu_1 = 29.51$
$r_2 = -4.5434$
   $d_2 = 0.0530$
$r_3 = -2.8939$
   $d_3 = 0.1395$  $n_2 = 1.74132$  $\nu_2 = 26.52$
$r_4 = -28.7100$
   $d_4 = 0.0698$
$r_5 = 0.6472$
   $d_5 = 0.3070$  $n_3 = 1.76300$  $\nu_3 = 25.68$

-continued $r_6 = 1.2643$
$f = 1$
$t = 0.3349$ $\left. \begin{array}{l} f_{12} = 2.614 \\ f_3 = 1.430 \end{array} \right\} \quad \dfrac{f_{12}}{f_3} = 1.83$ $D (= d_1 + d_2 + d_3 + d_4 + d_5) = 0.905$
$s = 0.48$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

2. An objective for video disks consisting of a first, second and third lenses, said first lens being a positive lens, said second lens being a negative lens, said third lens being a positive meniscus lens having a concave surface on the video disk side, said objective for video disks satisfying the following conditions:
   (1) $1.5 < f_{12}/f_3 < 3.0$
   (2) $0.7f < D < 1.65f$
wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and
   in which said objective for video disks has the following numerical data:

| | | | |
|---|---|---|---|
| $r_1 = 1.5769$ | | | |
| | $d_1 = 0.3353$ | $n_1 = 1.69981$ | $\nu_1 = 29.51$ |
| $r_2 = -4.5846$ | | | |
| | $d_2 = 0.0530$ | | |
| $r_3 = -2.8770$ | | | |
| | $d_3 = 0.1395$ | $n_2 = 1.74132$ | $\nu_2 = 26.52$ |
| $r_4 = -33.3617$ | | | |
| | $d_4 = 0.1675$ | | |
| $r_5 = 0.6308$ | | | |
| | $d_5 = 0.307$ | $n_3 = 1.763$ | $\nu_3 = 25.68$ |
| $r_6 = 1.2879$ | | | |

$f = 1$
$t = 0.3349$ $\left. \begin{array}{l} f_{12} = 2.688 \\ f_3 = 1.348 \end{array} \right\} \quad \dfrac{f_{12}}{f_3} = 1.98$ $D = 1.002$
$s = 0.44$ wherein reference symbols $r_1$ through $r_6$ respectively represent radii of curvature of respective lens surfaces, reference symbols $d_1$ through $d_5$ respectively thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

3. An objective for video disks consisting of a first, second and third lenses, said first lens being a positive lens, said second lens being a negative lens, said third lens being a positive meniscus lens having a concave surface on the video disk side, said objective for video disks satisfying the following conditions:
   (1) $1.5 < f_{12}/f_3 < 3.0$
   (2) $0.7f < D < 1.65f$
wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and
   in which said objective for video disks has the following numerical data:

| | | | |
|---|---|---|---|
| $r_1 = 1.3601$ | | | |
| | $d_1 = 0.4177$ | $n_1 = 1.6728$ | $\nu_1 = 31.08$ |
| $r_2 = -4.5817$ | | | |
| | $d_2 = 0.053$ | | |
| $r_3 = -2.8417$ | | | |
| | $d_3 = 0.1954$ | $n_2 = 1.74132$ | $\nu_2 = 26.52$ |
| $r_4 = 43.4851$ | | | |
| | $d_4 = 0.1675$ | | |
| $r_5 = 0.6087$ | | | |
| | $d_5 = 0.307$ | $n_3 = 1.763$ | $\nu_3 = 25.68$ |
| $r_6 = 1.2493$ | | | |

$f = 1$
$t = 0.3349$ $\left. \begin{array}{l} f_{12} = 2.566 \\ f_3 = 1.288 \end{array} \right\} \quad \dfrac{f_{12}}{f_3} = 1.99$ $D = 1.14$
$s = 0.39$ wherein reference symbols $r_1$ through $r_6$ respectively represent radii of curvature of respective lens surfaces, reference symbols $d_1$ throudh $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

4. An objective for video disks consisting of a first, second and third lenses, said first lens being a positive lens, said second lens being a negative lens, said third lens being a positive meniscus lens having a concave surface on the video disk side, said objective for video disks satisfying the following conditions:
   (1) $1.5 < f_{12}/f_3 < 3.0$
   (2) $0.7f < D < 1.65f$
   wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and in which said objective for video disks has the following numerical data:

| | | | |
|---|---|---|---|
| $r_1 = 1.4005$ | | | |
| | $d_1 = 0.4186$ | $n_1 = 1.763$ | $\nu_1 = 25.68$ |

-continued

| | | | |
|---|---|---|---|
| $r_2 = \infty$ | | | |
| | $d_2 = 0.0698$ | | |
| $r_3 = -2.6447$ | | | |
| | $d_3 = 0.1954$ | $n_2 = 1.52331$ | $\nu_2 = 48.90$ |
| $r_4 = \infty$ | | | |
| | $d_4 = 0.1786$ | | |
| $r_5 = 0.7064$ | | | |
| | $d_5 = 0.307$ | $n_3 = 1.763$ | $\nu_3 = 25.68$ |
| $r_6 = 2.5599$ | | | |
| | $f = 1$ | | |
| | $t = 0.4186$ | | |
| | $f_{12} = 2.631$ | $\dfrac{f_{12}}{f_3} = 2.21$ | |
| | $f_3 = 1.193$ | | |
| | $D = 1.169$ | | |
| | $s = 0.43$ | | | wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

5. An objective for video disks consisting of a first, second and third lenses, said first lens being a positive lens, said second lens being a negative lens, said third lens being a positive meniscus lens having a concave surface on the video disk side, said objective for video disks satisfying the following conditions:

(1) $1.5 < f_{12}/f_3 < 3.0$
(2) $0.7f < D < 1.65f$ wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and in which said objective for video disks has the following numerical data:

| | | | |
|---|---|---|---|
| $r_1 = 1.4177$ | | | |
| | $d_1 = 0.4996$ | $n_1 = 1.763$ | $\nu_1 = 25.68$ |
| $r_2 = -6.3926$ | | | |
| | $d_2 = 0.0636$ | | |
| $r_3 = -2.9891$ | | | |
| | $d_3 = 0.2344$ | $n_2 = 1.74132$ | $\nu_2 = 26.52$ |
| $r_4 = 7.7025$ | | | |
| | $d_4 = 0.2009$ | | |
| $r_5 = 0.6097$ | | | |
| | $d_5 = 0.3684$ | $n_3 = 1.763$ | $\nu_3 = 25.68$ |
| $r_6 = 1.5251$ | | | |
| | $f = 1$ | | |
| | $t = 0.3349$ | | |
| | $f_{12} = 2.723$ | $\dfrac{f_{12}}{f_3} = 2.4$ | |
| | $f_3 = 1.134$ | | |
| | $D = 1.37$ | | |
| | $s = 0.39$ | | | wherein reference symbols $r_1$ through $r_6$ respectively represent radii of curvature of respective lens surfaces, reference symbols $d_1$ and $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

6. An objective for video disks consisting of a first, second and third lenses, said first lens being a positive lens, said second lens being a negative lens, said third lens being a positive meniscus lens having a concave surface on the video disk side, said objective for video disks satisfying the following conditions:

(1) $1.5 < f_{12}/f_3 < 3.0$
(2) $0.7f < D < 1.65f$ wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and in which said objective for video disks has the following numerical data:

| | | | |
|---|---|---|---|
| $r_1 = 1.6389$ | | | |
| | $d_1 = 0.4189$ | $n_1 = 1.763$ | $\nu_1 = 25.68$ |
| $r_2 = -4.6948$ | | | |
| | $d_2 = 0.0698$ | | |
| $r_3 = -2.1398$ | | | |
| | $d_3 = 0.1954$ | $n_2 = 1.52331$ | $\nu_2 = 48.90$ |
| $r_4 = 6.7465$ | | | |
| | $d_4 = 0.1675$ | | |
| $r_5 = 0.6569$ | | | |
| | $d_5 = 0.307$ | $n_3 = 1.763$ | $\nu_3 = 25.68$ |
| $r_6 = 2.0347$ | | | |
| | $f = 1$ | | |
| | $t = 0.3349$ | | |
| | $f_{12} = 2.93$ | $\dfrac{f_{12}}{f_3} = 2.53$ | |
| | $f_3 = 1.16$ | | |
| | $D = 1.16$ | | |
| | $s = 0.42$ | | | wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers or respective lenses for d-line, reference symbol t represents the thickness of cover glass, reference symbol s represents the working distance.

7. An objective for video disks consisting of a first, second and third lenses, said first lens being a positive lens, said second lens being a negative lens, said third lens being a positive meniscus lens having a concave surface on the video disk side, said objective for video disks satisfying the following conditions:

(1) $1.5 < f_{12}/f_3 < 3.0$
(2) $0.7f < D < 1.65f$ wherein reference symbol f represents the focal length of the lens system as a whole, reference symbol $f_{12}$ represents the composite focal length of the first and second lenses, reference symbol $f_3$ represents the focal length of the third lens, and reference symbol D represents the overall length of the lens system, and in which said objective for video disks has the following numerical data:

| | | | |
|---|---|---|---|
| $r_1 = 1.5597$ | | | |
| | $d_1 = 0.5994$ | $n_1 = 1.763$ | $\nu_1 = 25.68$ |
| $r_2 = -9.8509$ | | | |
| | $d_2 = 0.0763$ | | |
| $r_3 = -3.0851$ | | | |
| | $d_3 = 0.2813$ | $n_2 = 1.74132$ | $\nu_2 = 26.52$ |
| $r_4 = 35.5353$ | | | |
| | $d_4 = 0.2411$ | | |
| $r_5 = 0.6066$ | | | |
| | $d_5 = 0.4421$ | $n_3 = 1.763$ | $\nu_3 = 25.68$ |
| $r_6 = 1.6564$ | | | |
| | $f = 1$ | | |
| | $t = 0.3349$ | | |

-continued $$\left. \begin{array}{l} f_{12} = 2.871 \\ f_3 = 1.061 \end{array} \right\} \frac{f_{12}}{f_3} = 2.71$$
$D = 1.64$
$s = 0.24$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 830$ nm, reference symbols $\nu_1$, $\nu_2$ and $\nu_3$ respectively represent Abbe's numbers of respective lenses for d-line, reference symbol t represents the thickness of cover glass, reference symbol s represents the working distance.

* * * * *